United States Patent
Yamamoto et al.

(10) Patent No.: US 8,643,214 B2
(45) Date of Patent: Feb. 4, 2014

(54) LOAD DRIVING DEVICE, VEHICLE EQUIPPED WITH LOAD DRIVING DEVICE, AND METHOD OF CONTROLLING LOAD DRIVING DEVICE

(75) Inventors: Masaya Yamamoto, Kasugai (JP);
Shinichi Shimakami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/818,363

(22) PCT Filed: Sep. 8, 2011

(86) PCT No.: PCT/IB2011/002090
§ 371 (c)(1),
(2), (4) Date: Feb. 22, 2013

(87) PCT Pub. No.: WO2012/032398
PCT Pub. Date: Mar. 15, 2012

(65) Prior Publication Data
US 2013/0187450 A1    Jul. 25, 2013

(30) Foreign Application Priority Data

Sep. 9, 2010    (JP) .................................. 2010-201843

(51) Int. Cl.
*B60L 1/00*    (2006.01)
(52) U.S. Cl.
USPC .......................................... 307/10.1; 307/9.1
(58) Field of Classification Search
USPC ................................. 307/9.1, 10.1
See application file for complete search history.

(56) References Cited

U.S. PATENT DOCUMENTS

| 2006/0165393 | A1 | 7/2006 | Yamada |
| 2010/0127665 | A1 | 5/2010 | Mitsutani |
| 2010/0185405 | A1 | 7/2010 | Aoshima et al. |
| 2013/0154360 | A1* | 6/2013 | Ito .................................. 307/9.1 |

FOREIGN PATENT DOCUMENTS

| EP | 2 159 897 A1 | 3/2010 |
| JP | A-11-136875 | 5/1999 |
| JP | A-2002-84666 | 3/2002 |
| JP | A-2005-210779 | 8/2005 |
| JP | A-2006-288030 | 10/2006 |

* cited by examiner

*Primary Examiner* — Robert L. Deberadinis
(74) *Attorney, Agent, or Firm* — Oliff PLC

(57) ABSTRACT

A Wout calculating portion summates limit values of respective power storage devices to calculate an output power limit value of a power storage portion. An excess current FB control portion executes an excess current FB control if at least one of currents IB1, IB2, and IBT exceeds a predetermined threshold. A Woutf correction processing portion corrects the output power limit value given to a motor power calculating portion to a motor power command value at a timing when at least one of the currents IB1, IB2, and IBT reaches the threshold. In a load driving device that includes a plurality of power storage devices connected in parallel to one another, respective parts may be appropriately protected from overcurrent while sufficiently exploiting the capacities of the plurality of the power storage devices to ensure motive energy performance.

7 Claims, 6 Drawing Sheets

F I G . 3
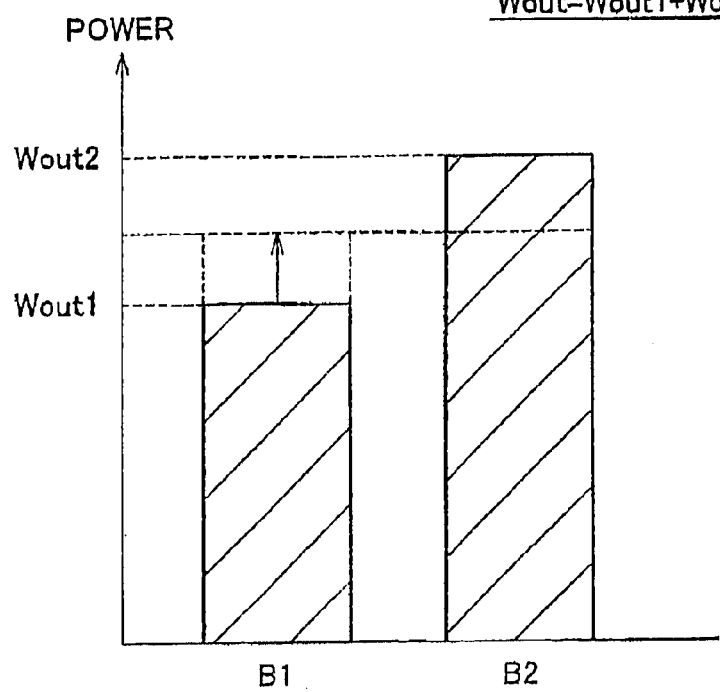
F I G . 4
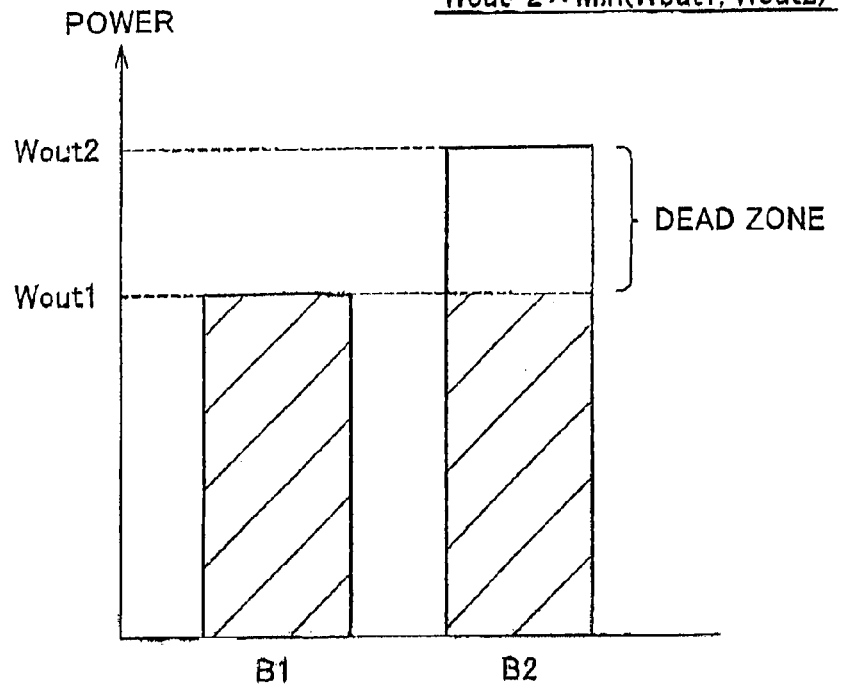

LOAD DRIVING DEVICE, VEHICLE EQUIPPED WITH LOAD DRIVING DEVICE, AND METHOD OF CONTROLLING LOAD DRIVING DEVICE

BACKGROUND OF THE INVENTION

1. Field of the Invention

The invention relates to a load driving device, a vehicle equipped with the load driving device, and a method of controlling the load driving device, and more particularly, to preventing overcurrent from occurring in a load driving device that includes a plurality of power storage devices connected in parallel, to one another.

2. Description of Related Art

Japanese Patent Application Publication No. 2002-84666 (JP-A-2002-84666) describes a battery system for an electric vehicle. In the battery system, a battery includes a plurality of unit battery cells connected in series to one another. Each of the plurality of the unit battery cells is provided with a discharge circuit. When a motor that propels the electric vehicle is stopped, a microcomputer is regularly activated to calculate the SOC of each of the unit battery cells. Then, when a difference in SOC between the unit battery cells is equal to or larger than a threshold value, the discharge circuit is driven through a discharge control signal from the microcomputer. Thus, the capacity of each of the unit battery cells is corrected.

According to the battery system, the dispersion of the self-discharge amount among the plurality of the unit battery cells may be easily corrected. Accordingly, it is supposed that the capacity of the battery can be sufficiently exploited, and that the reliability of the battery system can be enhanced (see Japanese Patent Application Publication No. 2002-84666 (JP-A-2002-84666)).

In electrically propelled vehicles such as hybrid vehicles, electric vehicles, for example, various attempts to increase the storage capacity of the power storage portion to improve drivability such as acceleration performance, sustainable traveling distance, or the like. A configuration in which a plurality of power storage devices are connected in parallel has been studied as a means of increasing the capacity of the power storage portion. In such a system, components (e.g., fuses) of the plurality of the power storage devices and components (a system main relay, a power element of a boost, device connected to the power storage portion, and the like) supplied with the resultant current from the respective power storage devices need to be appropriately protected from overcurrent, while ensuring the motive energy performance of the vehicle by sufficiently exploiting the capacities of the respective power storage devices. In the aforementioned Japanese Patent Application Publication No. 2002-84666 (JP-A-2002-84666), this problem and its solution are not taken into consideration.

SUMMARY OF THE INVENTION

The invention appropriately protects various components from overcurrent while ensuring motive energy performance by sufficiently exploiting the capacities of a plurality of power storage devices, which are connected in parallel to one another, in a load driving device that includes the plurality of the power storage devices.

A load driving device according to a first aspect of this invention is equipped with a power storage portion, a drive device, a plurality of first current sensors, a second current sensor, and a control device. The power storage portion includes a plurality of power storage devices connected in parallel to one another. The drive device drives a load with an aid of a power supplied from the power storage portion. The plurality of first current sensors are provided correspondingly to the plurality of the power storage devices respectively to detect input/output currents of corresponding ones of the power storage devices respectively. The second current sensor detects an input/output current of the power storage portion. The control device controls the drive device on a basis of the detected values of the plurality of the first current sensors and the second current sensor and limit values (Wout1, Wout2) set for output powers of the respective power storage devices respectively. The control device includes a power Limit value calculating portion, a feedback control portion, and a power limit value correcting portion. The power limit value calculating portion summates the limit values of the respective power storage devices to calculate an output power limit value (Wout) indicating a power that can be output from the power storage portion. The feedback control portion performs excess current feedback control when at least one of detected values of the plurality of the first current sensors and the second current sensor exceeds a predetermined threshold, by correcting the output power limit value on a basis of an amount of excess. The power limit value correcting portion corrects the output power limit value (Woutf) to a value indicating a power of the load at a timing when at least one of the detected values of the plurality of the first current sensors and the second current sensor reaches the threshold.

Preferably, the threshold is set for each of the detected values of the plurality of the first current sensors and the second current sensor. The feedback control portion includes a plurality of control calculation portions and a maximum value selecting portion. The plurality of the control calculation portions perform feedback control calculation for the detected values of the plurality of the first current sensors and the second current sensor respectively. The maximum value selecting portion, selects a largest one of control amounts calculated by the respective control calculation portions respectively to output the selected amount as a correction amount for the output power limit value.

More preferably, each of the control calculation portions executes a calculation that includes an integral term calculation. The power limit value correcting portion corrects the integral term such that the output power limit value becomes equal to the value indicating the power of the load.

A vehicle according to a second aspect of this invention is equipped with any one of the aforementioned load driving devices, an electric motor driven by the load driving device, and a driving wheel driven by the electric motor.

A third aspect of this invention relates to a method of controlling a load driving device. The load driving device is equipped with a power storage portion, a drive device, a plurality of first current sensors, and a second current sensor. The power storage portion includes a plurality of power storage devices connected in parallel to one another. The drive device drives a load with an aid of a power supplied from the power storage portion. The plurality of first current sensors are provided correspondingly to the plurality of the power storage devices respectively to detect input/output currents of corresponding ones of the power storage devices respectively. The second current sensor detects an input/output current of the power storage portion. The method of controlling the load driving device includes a step of summating limit values (Wout1, Wout2) set for output powers of the power storage devices respectively to calculate an output power limit value (Wout) indicating a power that can be output from the power storage portion, a step of correcting the output power limit value (Woutf) to a value indicating a power of the load at a timing when at least one of detected values of the plurality of the first current sensors and the second current sensor reaches a predetermined threshold, and a step of performing excess current feedback control when at least one of the detected values of the plurality of the first current sensors and the second current sensor exceeds the aforementioned threshold, by correcting the output power limit value on a basis of an amount of excess.

Preferably, the threshold is set for each of the detected values of the plurality of the first current sensors and the second current sensor. The step of performing excess current feedback control includes a step of performing feedback control calculation for each of the detected values of the plurality of the first current sensors and the second current sensor, and a step of selecting a largest one of control amounts calculated through the step of performing feedback control calculation to output the selected amount as a correction amount for the output power limit value.

More preferably, the feedback control calculation includes integral term calculation. The step of correcting the output power limit value includes a step of correcting the integral term such that the output power limit value becomes equal to a value indicating a power of the load.

In this invention, the output power limit value (Wout) is calculated by summating the limit values (Wout1, Wout2) of the respective power storage devices. Further, when at least one of the detected values of the plurality of the first current sensors and the second current sensor exceeds the threshold, excess current feedback control is performed. Furthermore, the output power limit value is corrected to the value indicating the power of the load at the timing when at least one of the detected values of the plurality of the first current sensors and the second current sensor reaches the threshold. Thus, the output power of the power storage portion is not unnecessarily limited, and the respective output currents of the plurality of the power storage devices and the power storage portion are held equal to or smaller than the threshold.

In consequence, according to this invention, in the load driving device including the plurality of the power storage devices connected in parallel to one another, the respective parts can be appropriately protected from overcurrent while sufficiently exploiting the capacities of the plurality of the power storage devices to ensure motive energy performance.

BRIEF DESCRIPTION OF THE DRAWINGS

Features, advantages, and technical and industrial significance of an example embodiment of the invention will be described below with reference to the accompanying drawings, in which like numerals denote like elements, and wherein:

FIG. 3 shows an example of limit values of power storage devices;

FIG. 4 shows a reference example of the limit values of the power storage devices;

DETAILED DESCRIPTION OF EMBODIMENT

Figure 1:
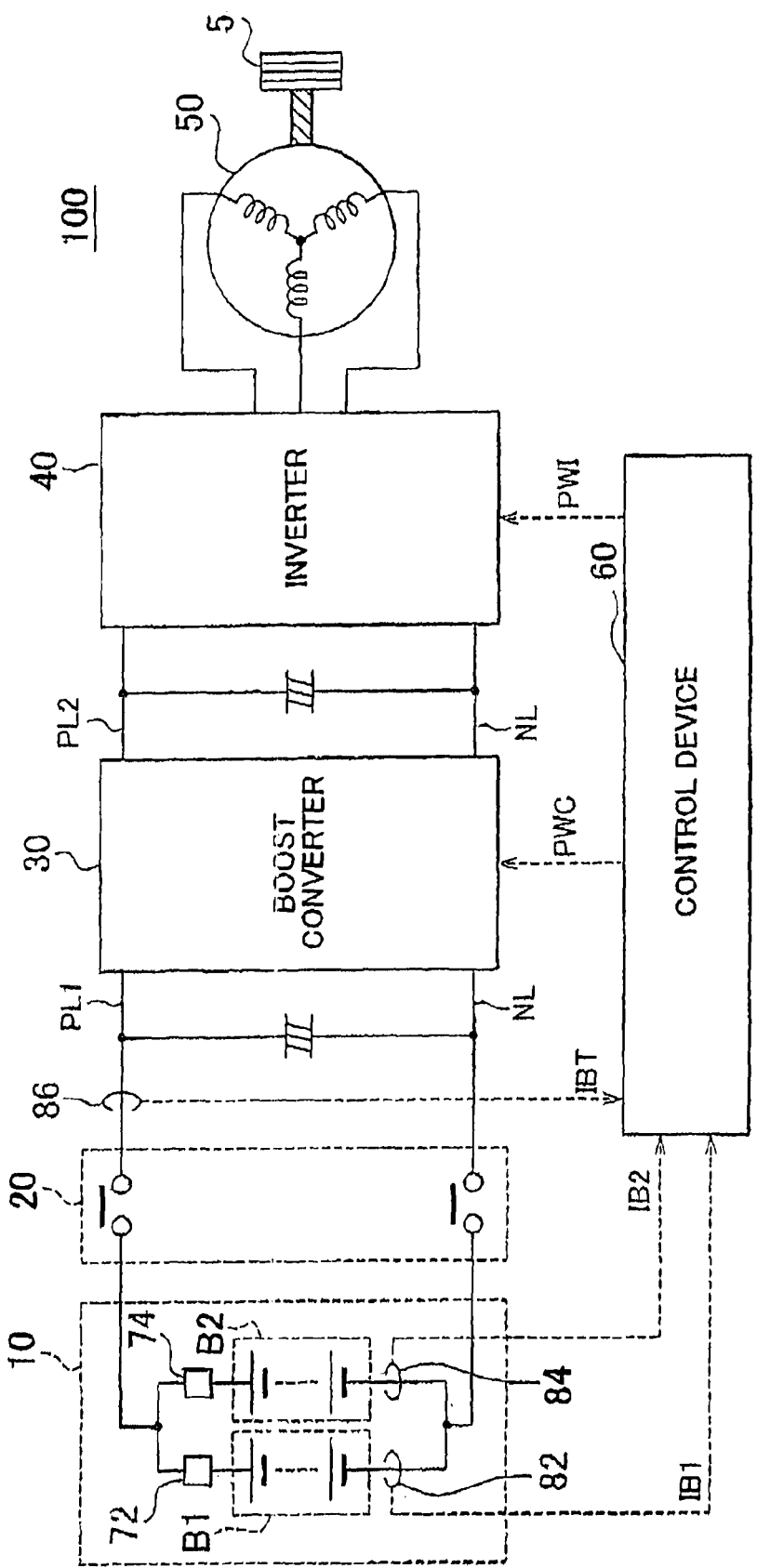
FIG. 1 is an overall schematic view of a vehicle equipped with a load driving device according to the embodiment of this invention.

An embodiment of the invention will be described in detail below with reference to the drawings. It should be noted that similar or equivalent components are denoted by the same reference symbols in the drawings so as to avoid the repetition of the same description.

FIG. 1 is an overall schematic view of a vehicle equipped with a load driving device according to the embodiment of this invention. Referring to FIG. 1, a vehicle 100 is equipped with a power storage portion 10, a system main relay (hereinafter referred to also as an SMR) 20, a boost converter 30, an inverter 40, a motor-generator 50, a driving wheel 55, a control device 60, and current sensors 82, 84, and 86.

The power storage portion 10 includes power storage devices B1 and B2 and fuses 72 and 74. The power storage devices B1 and B2 are connected in parallel to each other. Each power storage device B1 and B2 is a rechargeable direct-current power supply, and may be constituted by, for example, a secondary battery such as a nickel metal hydride battery, a lithium-ion battery, or the like. Power used to propel the vehicle 100 is stored in each power storage device B1 and B2, and the power storage devices B1 and B2 supply power to the boost converter 30. Further, when the brakes of the vehicle 100 are applied, the power storage devices B1 and B2 are charged using the power generated by the motor-generator 50. It should be noted that the power storage devices B1 and B2 may be constituted by a high-capacity capacitor or the like instead of being constituted by the secondary battery.

The fuses 72 and 74 are provided correspondingly for the power storage devices B1 and B2, respectively. The fuse 72 shuts off an electricity path of the power storage device B1 when a predetermined overcurrent flows through the power storage device B1. Likewise, the fuse 74 shuts off an electricity path of the power storage device B2 when a predetermined overcurrent flows through the power storage device B2.

The current sensor 82 detects the current IB1 flowing through the power storage device B1, and outputs the detected current to the control device 60. The current sensor 84 detects the current IB2 flowing through the power storage device B2, and outputs the detected current to the control device 60.

The SMR 20 is provided between the power storage portion 10 and the boost converter 30. The SMR 20 is driven by the control device 60. Upon receiving an ON command from the control device 60, the SMR 20 electrically connects the power storage portion 10 to the boost converter 30. In contrast, upon receiving an OFF command from the control device 60, the SMR 20 electrically disconnects the power storage portion 10 from the boost converter 30.

The current sensor 86 detects a current IBT indicating an input/output current of the power storage portion 10, and outputs the detected current to the control device 60. That is, the current sensor 86 detects a summated current of the current IB1 and the current IB2.

The boost converter 30 is provided between the SMR 20 and the inverter 40. The boost converter 30 boosts the voltage between a positive electrode line PL2 and a negative electrode line NL (hereinafter referred to also as "a system voltage") to equal or exceed the output voltage of the power storage portion 10, when the boost converter 30 receives a signal PWC from the control device 60. The boost converter 30 is constituted by, for example, a current reversible chopper circuit that includes a reactor connected to the positive electrode line PL1, and an upper arm and a lower arm that are connected in series to each other between the positive electrode line PL2 and the negative electrode line NL.

The inverter 40 is provided between the boost converter 30 and the motor-generator 50. In accordance with a signal PWI from the control device 60, the inverter 40 converts DC power supplied from the boost converter 30 into three-phase AC power, and outputs the three-phase AC power to the motor-generator 50 to drive the motor-generator 50. Further, in braking the vehicle 100, the inverter 40 converts three-phase AC power generated by the motor-generator 50 into DC power on the basis of the signal PWI, and outputs the DC power to the positive electrode line PL2. The inverter 40 is constituted by, for example, a bridge circuit that includes switching elements for each of the three phases.

The motor-generator 50 is mechanically coupled to a driving wheel 55. The motor-generator 50 is driven by the inverter 40, and generates a driving force to propel the vehicle 100. Further, in braking the vehicle 100, the motor-generator 50 receives the kinetic energy of the vehicle from the driving wheel 55, and generates power. It should be noted that if the vehicle 100 is a hybrid vehicle, the motor-generator 50 may be incorporated in the hybrid vehicle as a motor-generator that is mechanically coupled to an engine (not shown), generates power with the aid of motive energy of the engine, and also serves to start the engine.

The control device 60 generates the signal PWC for driving the boost converter 30 on the basis of respective detected values of the system voltage and the voltage of the power storage portion 10. The control device 60 outputs the generated signal PWC to the boost converter 30. It should be noted that the system voltage and the voltage of the power storage portion 10 are detected by voltage sensors (not shown).

Further, the control device 60 receives the detected values of the currents IB1 and IB2 from the current sensors 82 and 84 respectively. Furthermore, the control device 60 receives the detected value of the current IBT from the current sensor 86. The control device 60 then generates the signal PWI for driving the motor-generator 50 on the basis of respective detected values of the currents IB1, IB2, and IBT and limit values Wout1 and Wout2, which are set for output powers of the power storage devices B1 and B2 respectively. The control device 60 then outputs the generated signal PWI to the inverter 40.

Figure 2:
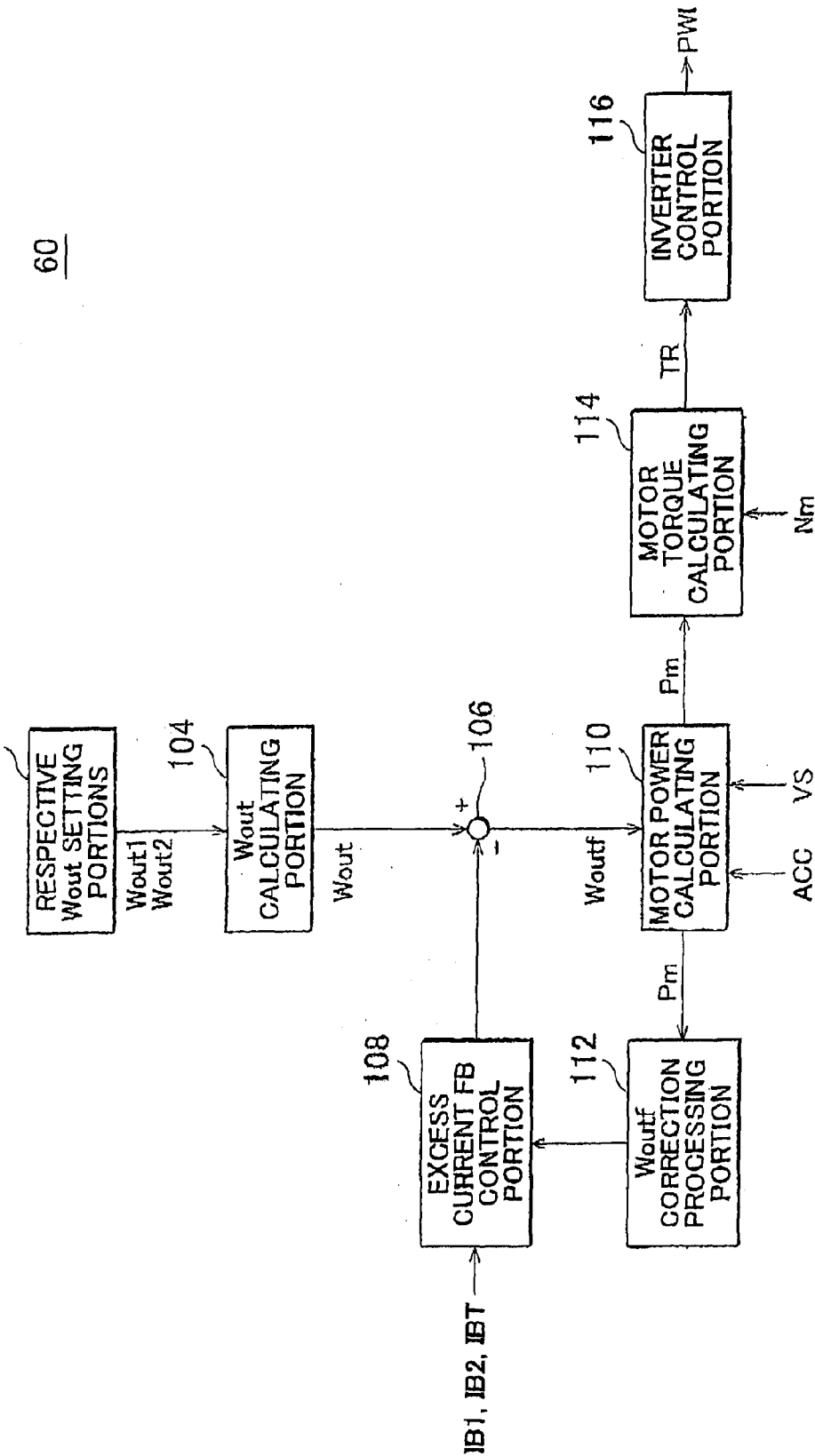
FIG. 2 is a detailed functional block diagram of the configuration of a control device shown in FIG. 1.

FIG. 2 is a functional block diagram that shows the configuration of the control device 60 shown in FIG. 1. Referring to FIG. 2; the control device 60 includes respective Wout setting portions 102, a Wout calculating portion 104, a subtraction portion 106, an excess current feedback (FB) control portion 108, a motor power calculating portion 110, a Woutf correction processing portion 112, a motor torque calculating portion 114, and an inverter control portion 116.

The Wout setting portions 102 set the limit value Wout1 of the output power of the power storage device B1 and the limit value Wout2 of the output power of the power storage device B2, respectively. The limit value Wout1 (Wout2) is set based on the state of charge (hereinafter referred to also as an SOC), the temperature, and the like of the power storage device B1 (B2). It should be noted that the SOC of the power storage device B1 (B2) may be calculated according to various known methods using a detected value of the voltage of the power storage device B1 (B2) and the detected value of the current IB1 (IB2).

The Wout calculating portion 104 adds the output power limits Wout1 and Wout2 to calculate the output power limit Wout for the power storage portion 10.

The subtraction portion 106 subtracts a control amount CB received from the excess current FB control portion 108 (which will be described later) from the output power limit value Wout calculated by the Wout calculating portion 104. The subtraction portion 106 outputs to the motor power calculating portion 110 the result of subtraction as an output power limit value Woutf. That is, the output power limit value Woutf is obtained by correcting the output power limit value Wout, which is calculated by the Wout calculating portion 104, through excess current FB control.

The excess current FB control portion 108 receives the respective detected values of the currents IB1, IB2, and IBT. If at least one of the detected values of the currents IB1, IB2, and IBT exceeds a predetermined threshold, the excess current FB control portion 108 executes an excess current FB control on the basis of an amount of excess. More specifically, the excess current FB control portion 108 corrects the output power limit value Wout on the basis of the amount of excess over the threshold, such that the current that has exceeded the threshold drops below the threshold. It should be noted that the calculated result of excess current FB control is output to the subtraction portion 106 as the control amount CB to be used in correcting the output power limit value Wout.

It should be noted herein that an integral term of excess current FB control is corrected by the Woutf correction processing portion 112 at a timing when at least one of the detected values of the currents IB1, IB2, and IBT reaches the threshold. More specifically, the integral term of excess current FB control is corrected so that the output power limit value Woutf sent to the motor power calculating portion 110 equals the value indicating the power of the motor-generator 50 (e.g., a motor power command value Pm). It should be noted that even if the integral term of the excess current FB control portion 108 is corrected, excess current FB control is permitted after the correction.

That is, if at least one of the detected values of the currents IB1, IB2, and IBT reaches the threshold, the integral term of excess current FB control is corrected at the timing, and the output power limit value Woutf is thereby corrected to the value indicating the power of the motor-generator 50. Furthermore, if at least one of the detected values of the currents IB1, IB2, and IBT exceeds the threshold, the excess current FB control portion 108 executes the excess current FB control.

The motor power calculating portion 110 receives an accelerator operation amount signal ACC that indicates the accelerator operation amount, and a vehicle speed signal VS that indicates the vehicle speed. It should be noted that each of the accelerator operation amount and the vehicle speed may be detected by a sensor (not shown). The motor power calculating portion 110 calculates the motor power command value Pm, which indicates a motor power required of the motor-generator 50 (FIG. 1), based on the accelerator operation amount, the vehicle speed, and the like. It should be noted herein that if the motor power command value Pm exceeds the output power limit value Woutf received from the subtraction portion 106, the output power limit value Woutf limits the motor power command value Pm.

The Woutf correction processing portion 112 receives the value indicating the power of the motor-generator 50 (e.g., the motor power command value Pm) from the motor power calculating portion 110. Then, when at least one of the detected values of the currents IB1, IB2, and IBT reaches the threshold, the Woutf correction processing portion 112 corrects the integral term of excess current FB control so that the output power limit value Woutf sent to the motor power calculating portion 110 equals the value indicating the power of the motor-generator 50. It should be noted that it is appropriate to determine whether or not at least one of the detected values of the currents IB1, IB2, and IBT has reached the threshold, after the Woutf correction processing portion 112 has received either notification from the excess current FB control portion 108 or the detected values of the currents IB1, IB2, and IBT.

The motor torque calculating portion 114 receives the motor power command value Pm calculated by the motor power calculating portion 110. The motor torque calculating portion 114 then divides the motor power command value Pm by the rotational speed Nm of the motor-generator 50 to calculate the torque command value TR, which is the amount of torque that the motor-generator 50 is required to generate.

The inverter control portion 116 generates a pulse width modulation (PWM) signal for driving the inverter 40 (FIG. 1) so that the motor-generator 50 outputs the motor torque indicated by the torque command value TR. The inverter control portion 116 outputs to the inverter 40 the generated PWM signal as the signal PWT.

As described above, in this embodiment of the invention, the power storage portion 10 is composed of the power storage devices B1 and B2 connected in parallel to each other. The output power limit value Wout of the power storage portion 10 is then calculated by adding the limit values Wout1 and Wout2 of the power storage devices B1 and B2.

FIG. 3 is a view showing an example of the limit values Wout 1 and Wout 2 of the power storage devices B1 and B2. Referring to FIG. 3, even if the power storage devices B1 and B2 are both of the same type, the dispersion or the like of the temperatures, SOC's and the like of the power storage devices B1 and B2 resulting from the environment of installation may lead to a difference between the limit values Wout1 and Wout2. It should be noted herein that the summated value of the limit values Wout1 and Wout2 is regarded as the output power limit value Wout of the power storage portion 10 according to this embodiment. Thus, even if the limit value Wout1 differs from Wout2, the maximum power that can be output by the power storage portion 10 may be supplied to the motor-generator 50.

However, if there is no substantial difference between internal resistances of the power storage devices B1 and B2, regardless of a difference between the limit values Wout1 and Wout2, the outputs from the power storage devices B1 and B2 are averaged, so that the limit value may be exceeded in the power storage device with the lower the limit value (B1 in FIG. 3). Thus, in this embodiment of the invention, if the excess current FB control is executed, the output power limit value Woutf sent to the motor power calculating portion 110 is restricted to the value indicating the power of the motor-generator 50 (the motor power command value Pm). Thus, the protection of parts through the prevention of overcurrent can also be realized while ensuring the motive energy performance of the motor-generator 50 to the maximum possible extent.

Alternatively, to protect component parts, the output power limit value Wout of the power storage portion 10 may be determined by doubling the smaller one of the limit values Wout1 and Wout2 of the power storage devices B1 and B2 (Wout1 in FIG. 4). In this case, however, a dead zone is created in the larger one of the limit values Wout1 and Wout2 (Wout2 in FIG. 4), and the capacity of the power storage device B2 cannot be utilized to the maximum possible extent. Thus, as described above, in this embodiment of the invention, the summated value of the limit values Wout1 and Wout2 is adopted as the output power limit value Wout, and the output power limit value Woutf is corrected to the motor power value when the excess current FB control is executed. As a result, while ensuring the capacity to supply power from the power storage portion 10 to the motor-generator 50 to the maximum possible extent, the protection of parts is also taken into consideration.

Figure 5:
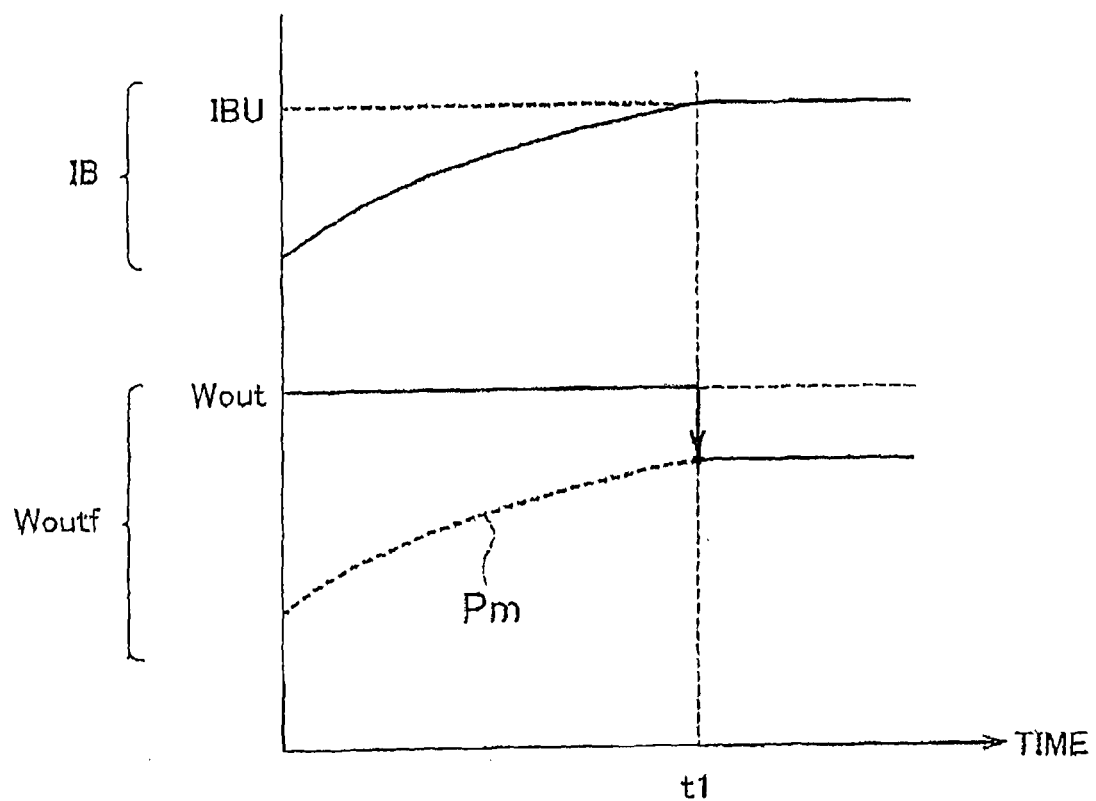
FIG. 5 shows a current and an output power limit value.

FIG. 5 shows the correlation of the current IB with the output power limit value Woutf. Referring to FIG. 5, the current IB indicates that one of the currents IB1, IB2, and IBT which reaches an upper limit IBU at a time t1. That is, one of the currents IB1, IB2, and IBT reaches the upper limit IBU at the time t1. It should be noted that the upper limit IBU differs depending on each of the currents IB1 (IB2) and IBT.

When the current LB reaches the upper limit IBU at the time t1, excess current feedback control is executed based on the current IB. Furthermore, in this embodiment of the invention, the output power limit value Woutf sent to the motor power calculating portion 110 is corrected to a value that indicates the power of the motor-generator 50 (e.g., the motor power command value Pm) at the timing when the current IB reaches the upper limit IBU. Thus, the excess of power and the excess of current can be reliably prevented at and after the time t1.

Figure 6:
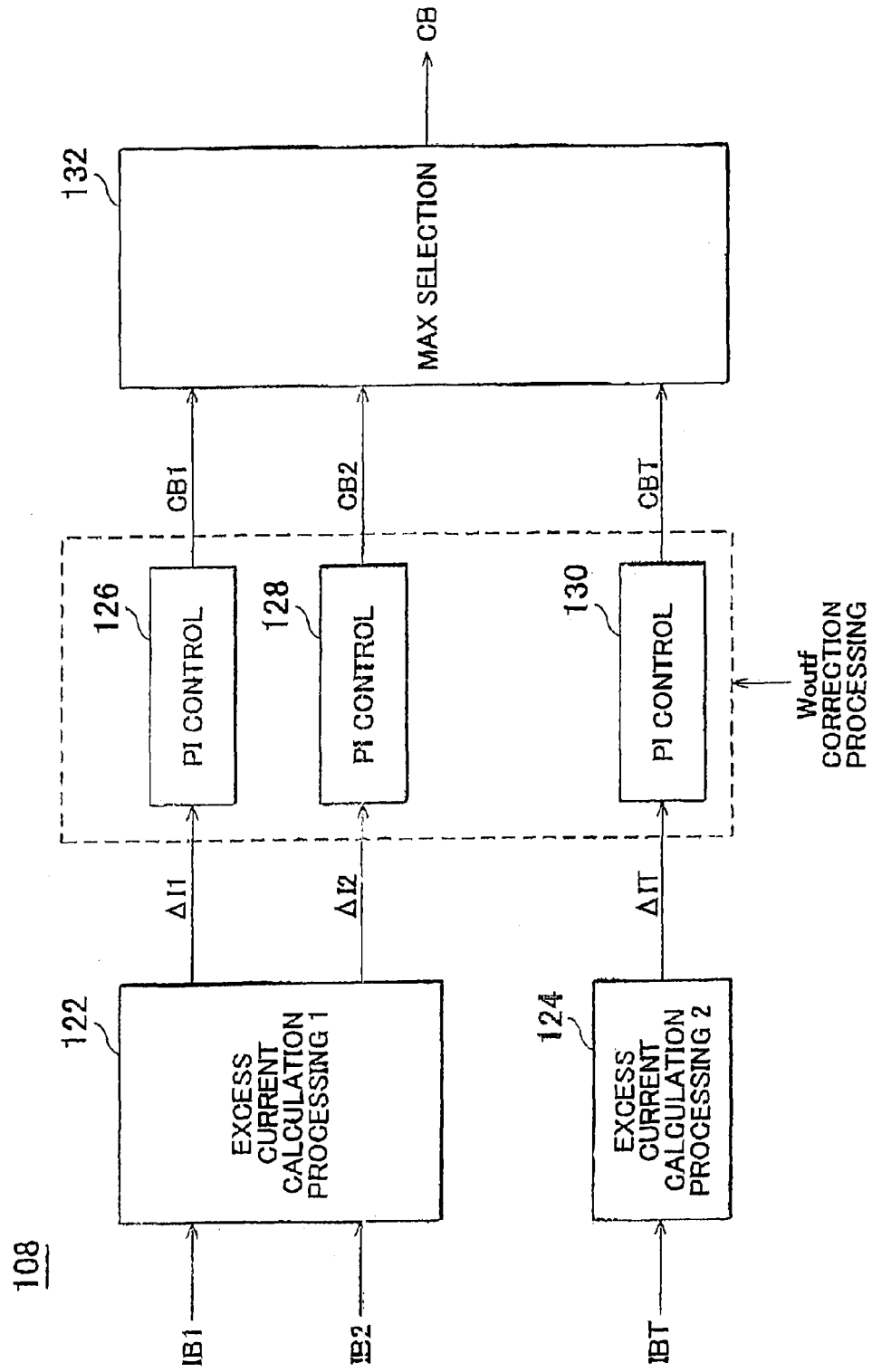
FIG. 6 is a detailed functional block diagram of an excess current FB control portion shown in FIG. 2.

FIG. 6 is a detailed functional block diagram of the excess current FB control portion 108 shown in FIG. 2. Referring to FIG. 6, the excess current FB control portion 108 includes excess current calculation processing portions 122 and 124, PI control portions 126, 128, and 130, and a maximum value selecting portion 132.

The excess current calculation processing portion 122 receives detected values of the currents IB1 and IB2 from the current sensors 82 and 84 (FIG. 1), respectively. Then, if the current IB1 exceeds a predetermined threshold, the excess current calculation processing portion 122 calculates the excess current $\Delta I1$ and outputs the excess current $\Delta I1$ to the PI control portion 126. By the same token, if the current IB2 exceeds the above threshold, the excess current calculation processing portion 122 calculates the excess current $\Delta I2$ and outputs the excess current $\Delta I2$ to the PI control portion 128. It should be noted that the above-described threshold is determined based on, for example, the specification of the fuses 72 and 74 provided in the power storage devices B1 and B2, respectively.

The excess current calculation processing portion 124 receives a detected value of the current IBT from the current sensor 86 (FIG. 1). Then, if the current IBT exceeds a predetermined threshold, the excess current calculation processing portion 124 calculates the excess current $\Delta IT$ and outputs the excess current $\Delta IT$ to the PI control portion 130. It should be noted that the aforementioned threshold used in the excess current calculation processing portion 124 is determined based on, for example, the specification of power elements and the like constituting the SMR 20 and the boost converter 30.

The PI control portion 126 performs proportional-plus-integral (PI) calculation using the excess current $\Delta I1$ concerning the current IB1, and outputs the calculated result as the control amount CB1. The PI control portion 128 performs proportional-plus-integral calculation using the excess current $\Delta I2$ concerning the current IB2, and outputs the calculated result as the control amount CB2. The PI control portion 130 performs proportional-plus-integral calculation using the excess current $\Delta IT$ concerning the current IBT, and outputs the calculated result as a control amount CBT.

It should be noted herein that the Woutf correction processing portion 112 (FIG. 2) corrects the integral terms of the PI control portions 126, 128, and 130 at the timing when at least one of the currents IB1, IB2, and IBT reaches a corresponding one of the thresholds. More specifically, the integral terms are corrected so that the output power limit value Woutf becomes equal to the value indicating the power of the motor-generator 50 (e.g., the motor power command value Pm).

The maximum value selecting portion 132 receives the control amounts CB1, CB2, and CBT from the PI control portions 126, 128, and 130 respectively. The maximum value selecting portion 132 then selects that one of the control amounts CB1, CB2, and CBT whose absolute value is the largest, and outputs the selected value as the control amount CB to the subtraction portion 106 (FIG. 2).

That is, in the excess current FB control portion 108, the current threshold is set for each of the power storage devices B1 and B2 and the power storage portion 10. Excess current FB control is then performed for each of the currents IB1, IB2, and IBT, and the largest of the control amounts is output as the final control amount CB. Thus, the components of each power storage device B1 and B2, as well as components of the SMR 20, the boost converter 30, and the like, which receive current from the power storage portion 10, may be adequately protected.

Figure 7:
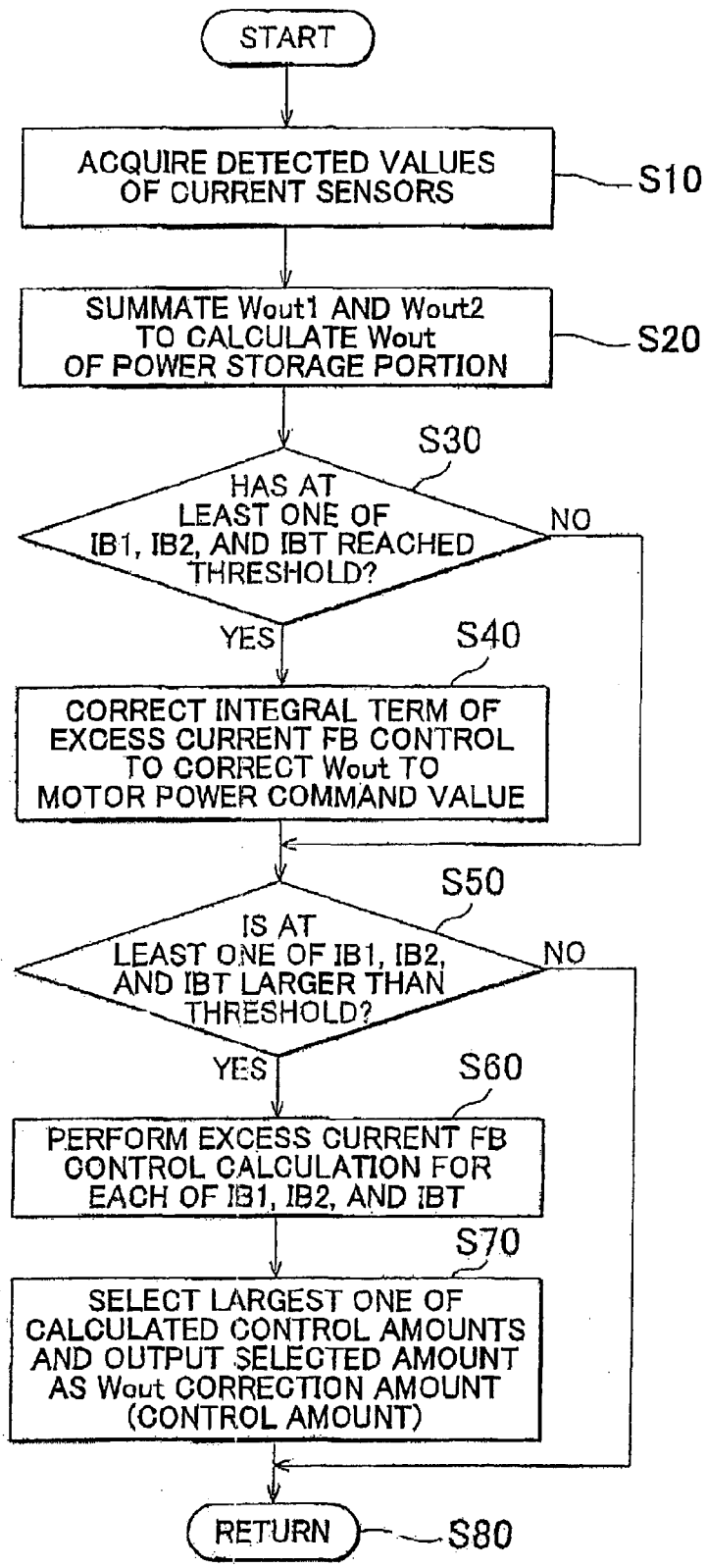
FIG. 7 is a flowchart that shows the process executed by the control device shown in FIG. 1.

FIG. 7 is a flowchart of the process executed by the control device 60 shown in FIG. 1. FIG. 7 shows the process of correcting the output power limit value Wout. It should be noted that the process shown in the flowchart is called from a main routine and executed at predetermined time intervals or when a predetermined condition is satisfied.

Referring to FIG. 7, the control device 60 acquires the detected values of the currents IB1, IB2, and IBT from the current sensors 82, 84, and 86 respectively (step S10). Subsequently, the control device 60 combines the limit values Wout1 and Wout2 of the power storage devices B1 and B2 to calculate the output power limit value Wout of the power storage portion 10 (step S20).

Next, the control device 60 determines whether at least one of the currents IB1, IB2, and IBT has reached a predetermined threshold (step S30). If it is determined that at least one of the currents IB1, IB2, and IBT has reached the threshold (YES in step S30), the control device 60 corrects the integral term of excess current FB control to correct the output power limit value Woutf to the motor power command value Pm (step S40). It should be noted that if it is determined that none of the thresholds IB1, IB2, and IBT has reached the threshold (NO in step S30), the process skips step S40 and proceeds to step S50.

Subsequently, the control device 60 determines whether or not at least one of the currents IB1, IB2, and IBT is larger than the threshold (step S50). If it is determined that at least one of the currents IB1, IB2, and IBT exceeds the threshold (YES in step S50), the control device 60 executes the excess current FB control calculation for each of the currents IB1, IB2, and IBT (step S60). The control device 60 then selects the largest one of the control amounts CB1, CB2, and CBT calculated for the currents IB1, IB2, and IBT respectively, and outputs the selected value as the Wout correction amount (the control amount) (step S70).

It should be noted that if it is determined that none of the currents IB1, IB2, and IBT exceeds the threshold (NO in step S50), the process skips step S60 and S70 and proceeds directly to step S80.

As described above, in this embodiment of the invention, the output power limit value Wout of the power storage portion 10 is calculated by summating the limit values Wout1 and Wout2 of the power storage devices B1 and B2. Further, if at least one of the detected values of the current sensors 82 and 84 and the current sensor 86 exceeds the threshold, the excess current FB control is executed. Furthermore, the output power limit value Woutf is corrected to the value indicating the power of the motor-generator 50 (e.g., the motor power command value Pm) at the timing when at least one of the detected values of the current sensors 82 and 84 and the current sensor 86 reaches the threshold. Thus, the output power of the power storage portion 10 is not unnecessarily limited, and the respective output currents of the power storage devices B1 and B2 and the power storage portion 10 remain equal to or smaller than the threshold.

Thus, according to this embodiment of the invention, in the load driving device that includes the plurality of the power storage devices B1 and B2 that are connected in parallel to each other, the respective parts may be appropriately protected from overcurrent while sufficiently exploiting the capacities of the plurality of the power storage devices B1 and B2 to ensure motive energy performance.

It should be noted that although the power storage portion 10 includes the two power storage devices B1 and B2 connected in parallel to each other in the foregoing embodiment of the invention, three or more power storage devices may be connected in parallel to one another to constitute the power storage portion 10. Further, although the boost converter 30 is provided in the foregoing embodiment of the invention, this invention is also applicable to a system that does not include the boost converter 30.

Further, in the above embodiment of the invention, the vehicle 100 may be an electric vehicle that is powered solely by the motor-generator 50, or a hybrid vehicle that further includes an engine that also propels the hybrid vehicle. In addition, the vehicle 100 may be a fuel-cell-powered vehicle that includes a fuel cell as well as the power storage portion 10.

It should be noted in the foregoing description that the inverter 40 may be regarded as corresponding to one embodiment of "the drive device" in this invention. Further, the current sensors 82 and 84 may be regarded as corresponding to one embodiment of "the plurality of the first current sensors" in this invention, and the current sensor 86 may be regarded as corresponding to one embodiment of "the second current sensor" in this invention.

Furthermore, the Wout calculating portion 104 may be regarded as corresponding to one embodiment of "the power limit value calculating portion" in this invention, and the excess current FB control portion 108 may be regarded as corresponding to one embodiment of "the feedback control portion" in this invention. Also, furthermore, the Woutf correction processing portion 112 may be regarded as corresponding to one embodiment of "the power limit value correcting portion" in this invention, and the PI control portions 126, 128, and 130 may be regarded as corresponding to one embodiment of "the plurality of the control calculation portions" in this invention.

The described embodiment of the invention should be considered illustrative in all respects but not limitative. The scope of the invention is not restricted to the particulars of the described embodiment but by the claims. The invention is intended to encompass all modifications that are substantially equivalent to the claims.

The invention claimed is:

1. A load driving device comprising:
a power storage portion including a plurality of power storage devices connected in parallel to one another;
a drive device that drives a load using a power supplied from the power storage portion;
a plurality of first current sensors that are provided so as to respectively correspond to the plurality of power storage devices to detect input/output currents of the corresponding power storage devices;
a second current sensor that detects an input/output current of the power storage portion; and
a control device that controls the drive device on a basis of the detected values of the plurality of the first current sensors and the second current sensor and limit values set for output powers of the plurality of the power storage devices respectively, wherein the control device includes:

a power limit value calculating portion that calculates an output power limit value, which indicates the power that the power storage portion is capable of outputting, by adding the respective limit values of the plurality of the power storage devices;

a power limit value correcting portion that corrects, if at least one of the detected values of the plurality of the first current sensors and the second current sensor reaches a predetermined threshold, the output power limit value to a value indicating a power of the load at a timing when at least one of the detected values of the plurality of the first current sensors and the second current sensor reaches the predetermined threshold; and a feedback control portion that executes an excess current feedback control for further correcting the output power limit value corrected by the power limit value correcting portion on a basis of an amount by which the at least one of the detected values exceeds the threshold.

2. The load driving device according to claim 1, wherein the threshold is set for each of the detected values of the plurality of the first current sensors and the second current sensor, and the feedback control portion includes:

a plurality of control calculation portions that perform feedback control calculation for each of the detected values of the plurality of the first current sensors and the second current sensor; and a maximum value selecting portion that selects the largest of control amounts calculated by the plurality of the control calculation portions respectively to output the selected amount as a correction amount for the output power limit value.

3. The load driving device according to claim 2, wherein each of the plurality of the control calculation portions executes a calculation that includes an integral term calculation, and the power limit value correcting portion corrects the integral term so that the output power limit value becomes equal to the value indicating the power of the load.

4. A vehicle comprising:

the load driving device according to claim 1;

an electric motor driven by the load driving device; and a driving wheel driven by the electric motor.

5. A method of controlling a load driving device that includes a power storage portion including a plurality of power storage devices connected in parallel to one another; a drive device that drives a load using power supplied from the power storage portion; a plurality of first current sensors that are provided so as to respectively correspond to the plurality of each the power storage devices to detect input/output currents of the corresponding power storage device; and a second current sensor that detects input/output current of the power storage portion, the method comprising:

calculating an output power limit value, which indicates the power that the power storage portion is capable of outputting, by adding limit values set for output powers of the plurality of the power storage devices respectively;

correcting, if at least one of the detected values of the plurality of the first current sensors and the second current sensor reaches a predetermined threshold, the output power limit value to a value indicating a power of the load at a timing when the at least one of detected values reaches the threshold; and executing an excess current feedback control for further correcting the output power limit value corrected in the correcting step, on a basis of an amount by which the at least one of the detected values exceeds the threshold.

6. The method of controlling the load driving device according to claim 5, wherein the threshold is set for each of the detected values of the plurality of the first current sensors and the second current sensor, and the execution of the excess current feedback control includes:

a step of executing a feedback control calculation for each of the detected values of the plurality of the first current sensors and the second current sensor, and a step of selecting the largest of control amounts calculated through the step of performing the feedback control calculation to output the selected amount as a correction amount for the output power limit value.

7. The method of controlling the load driving device according to claim 6, wherein the feedback control calculation includes an integral term calculation, and the correction of the output power limit value includes correcting the integral term so that the output power limit value becomes equal to a value indicating a power of the load.

* * * * *